United States Patent [19]

Takada et al.

[11] Patent Number: 4,480,303

[45] Date of Patent: Oct. 30, 1984

[54] DIGITAL CONTROLLER OF ANALOG SYSTEMS CONTAINING ISOLATION CIRCUITRY AND ERROR DETECTION CIRCUITRY

[75] Inventors: Keisuke Takada, Kodaira; Hiroo Okuhara, Inagi, both of Japan

[73] Assignee: Tokyo Shibaura Denki Kabushiki Kaisha, Japan

[21] Appl. No.: 389,960

[22] Filed: Jun. 18, 1982

[30] Foreign Application Priority Data

Aug. 12, 1981 [JP] Japan .................. 56-126409

[51] Int. Cl.³ .................. G05B 13/00; G06B 15/00
[52] U.S. Cl. .................. 364/138; 364/184; 318/565
[58] Field of Search .............. 364/138, 180, 184, 186, 364/139; 318/563, 565, 599

[56] References Cited

U.S. PATENT DOCUMENTS

| | | | |
|---|---|---|---|
| 3,034,718 | 5/1962 | Freitas et al. | 364/139 |
| 3,720,819 | 3/1973 | Newton et al. | 235/153 |
| 3,974,364 | 8/1976 | Sallberg et al. | 364/176 |
| 3,984,665 | 10/1976 | Shriver et al. | |
| 4,074,354 | 2/1978 | Nakagawa et al. | 364/139 X |
| 4,115,860 | 9/1978 | Atwater | 364/492 |
| 4,118,772 | 10/1978 | Takada | 364/138 X |

OTHER PUBLICATIONS

"Multi-Loop Process Controller Based on Microprocessor," Advances in Instrumentation, ISA/76 by Akihiro Uyetani.

Primary Examiner—Charles E. Atkinson
Assistant Examiner—Allen MacDonald
Attorney, Agent, or Firm—Finnegan, Henderson Farabow, Garrett & Dunner

[57] ABSTRACT

A digital controller includes a central processor unit for generating a processed signal to be stored in an up-down counter. A manipulation signal generation circuit converts the contents of the up-down counter to a manipulation signal for an actuator. A feedback signal from a first coupling circuit connected to the up-down counter through a pulse width converter is applied to the central processor through an analog input circuit. The output signal of the up-down counter from the first coupling circuit and the output signal of the manipulation signal generation circuit are compared by a monitor circuit. An abnormality detection signal of the monitor circuit is generated as a result of the comparison and is applied to the central processor unit through a second coupling circuit.

3 Claims, 3 Drawing Figures

DIGITAL CONTROLLER OF ANALOG SYSTEMS CONTAINING ISOLATION CIRCUITRY AND ERROR DETECTION CIRCUITRY

BACKGROUND OF THE INVENTION

This invention relates to digital controllers, and more particularly to a direct digital controller (DDC) in which isolation means is provided between an analog signal circuit and a digital circuit.

A direct digital controller produces a direct current signal (4 to 20 mA (milliampere) which represents a manipulated variable signal and which is applied to an acutator such as a motor valve. A block diagram representative of a DDC is shown in FIG. 1. The DDC, as shown in FIG. 1, can be used to control a motor valve in a process.

Analog signals from a plurality of detectors 10A, 10B, . . . are applied to an analog input circuit 12 which comprises a multiplexer 14 and an analog-to-digital (A/D) converter 16. The analog signals are scanned in a time-sharing manner. Each time an analog signal is scanned the signal is converted to a corresponding digital signal by the A/D converter 16. The digital signal is provided as an input of a central processor unit (CPU) 18 which comprises, for example, a microprocessor. The digital signal received by the CPU 18 is processed and stored in a ten-bit up-down counter 20.

A predetermined value corresponding to a base or reference operation of an actuator 22 is initially stored in the up-down counter 20 by the CPU 18. When the operation of the actuator 22 changes, the CPU 18 provides an appropriate up-count signal or down-count signal to the up-down counter 20 as an error signal from the base or reference value. An instruction signal corresponding to a manipulated variable signal which is applied to the actuator 22 is digitally stored in the up-down counter 20.

The instruction signal stored in the up-down counter 20 is converted to an analog manipulation voltage signal AV by a digital-to-analog (D/A) converter 24. The voltage signal AV is converted to an analog manipulation current signal AI by a voltage-to-current (V/I) converter 26.

The current signal AI is applied to the motor valve actuator 22 as the manipulated variable signal. The DC voltage value of the manipulation voltage signal AV varies within the range between 0 to 5 V in accordance with the opening of the motor valve 22. The DC current value of the current signal AI also varies within the range between 4 to 20 mA.

The manipulation voltage signal AV of the D/A converter 24 is supplied as a feedback signal to the multiplexer 14 for the purpose of correcting the errors in the signal values in the digital processing loop including the CPU 18.

In the DDC shown in FIG. 1, the signal transfer lines connected between the CPU 18 and the detectors 10A, 10B, . . . and the signal line to the motor valve 22 are oftentimes interconnected with other process equipment located at great distances from the DDC. These signal lines are often plagued with noise signals such as common mode voltage signals or impulse noise signals. The output voltage signal AV of the D/A converter 24 has a potential level applied to the multiplexer 14 as the feedback signal. However, the output of the V/I converter 26 cannot be examined by CPU 18.

FIG. 2 shows a schematic block diagram of a prior art DDC. In the DDC shown in FIG. 2, the analog input circuit and the CPU 18 are connected by an isolation transformer 28. Similarly, the D/A converter 24 and the V/I converter 26 are connected by an isolation transformer 30. Manipulation current for the motor valve 22 is detected by another isolation transformer 32 and the manipulation current is applied to the multiplexer 14 as a feedback signal. In the DDC shown in FIG. 2, however, the analog signal loop and the digital signal loop must be isolated by the isolation transformers. Since the analog signal such as the manipulation current for the motor valve must be used as the feedback signal, there is still a problem that noise signals will be present in the analog signal.

SUMMARY OF THE INVENTION

It is an object of this invention to provide a digital controller in which analog input and output circuits and a feedback circuit are isolated from a central processor unit in an effective manner.

The digital controller comprises a plurality of detectors producing analog signals, an analog input circuit for converting the analog signals to corresponding digital signals, a central processor unit for processing the digital signals, counter means for counting an output signal of the central processor unit, a pulse width converter circuit for producing a pulse signal having a pulse width corresponding to the content of the counter means, first coupling means for producing a first signal in accordance with the pulse signal of the pulse width converter circuit, a manipulation signal generation circuit for producing an analog manipulation signal in accordance with the first signal of the first coupling means, a monitor circuit for producing an abnormality detection signal if the ratio between the first signal and the manipulation signal is higher than the predetermined value, second coupling means for producing a second signal in accordance with the abnormality detection signal of the monitor circuit and for applying the second signal to the central processor unit, and a feedback circuit for applying the first signal to the analog input circuit.

DESCRIPTION OF THE PREFERRED EMBODIMENT

Figure 1:
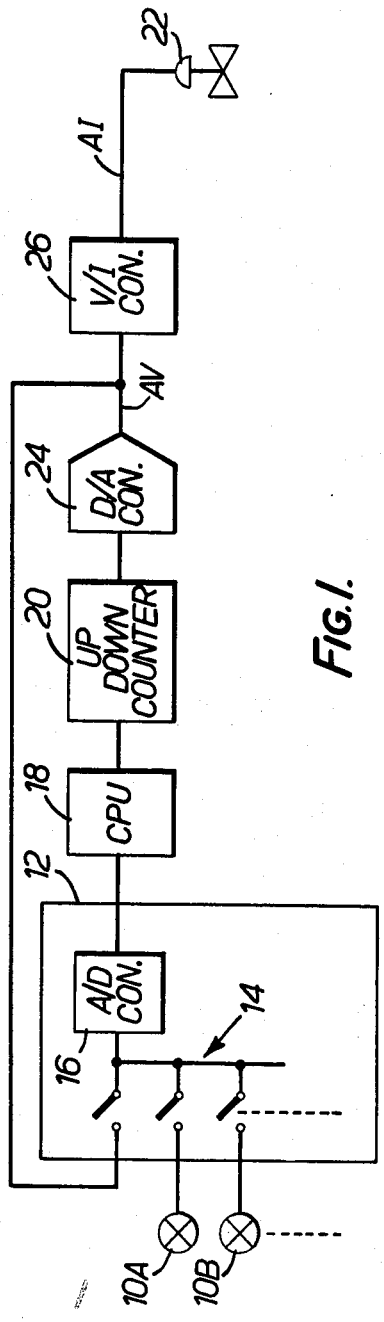
FIG. 1 is a block diagram of a digital controller.
Figure 2:
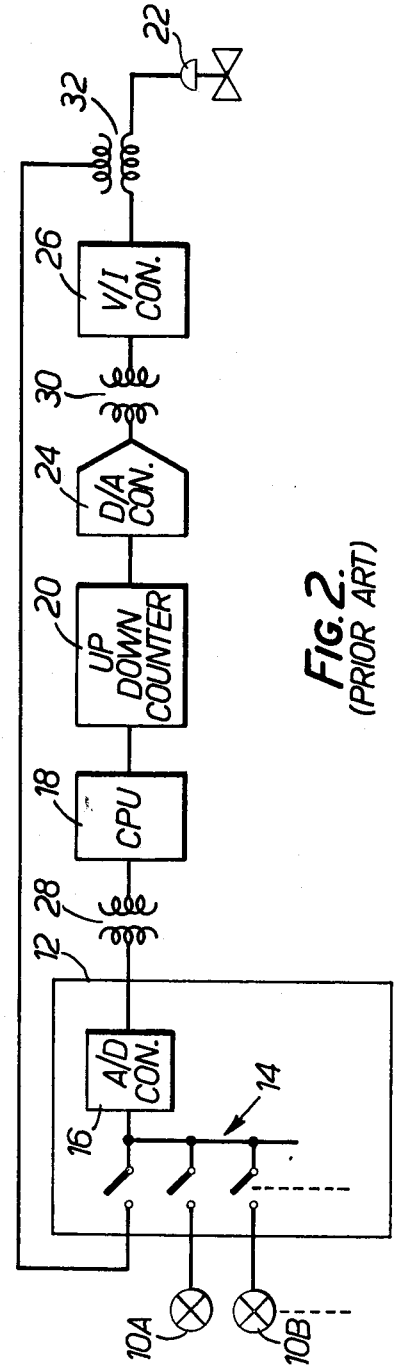
FIG. 2 is a block diagram of a prior art digital controller.
Figure 3:
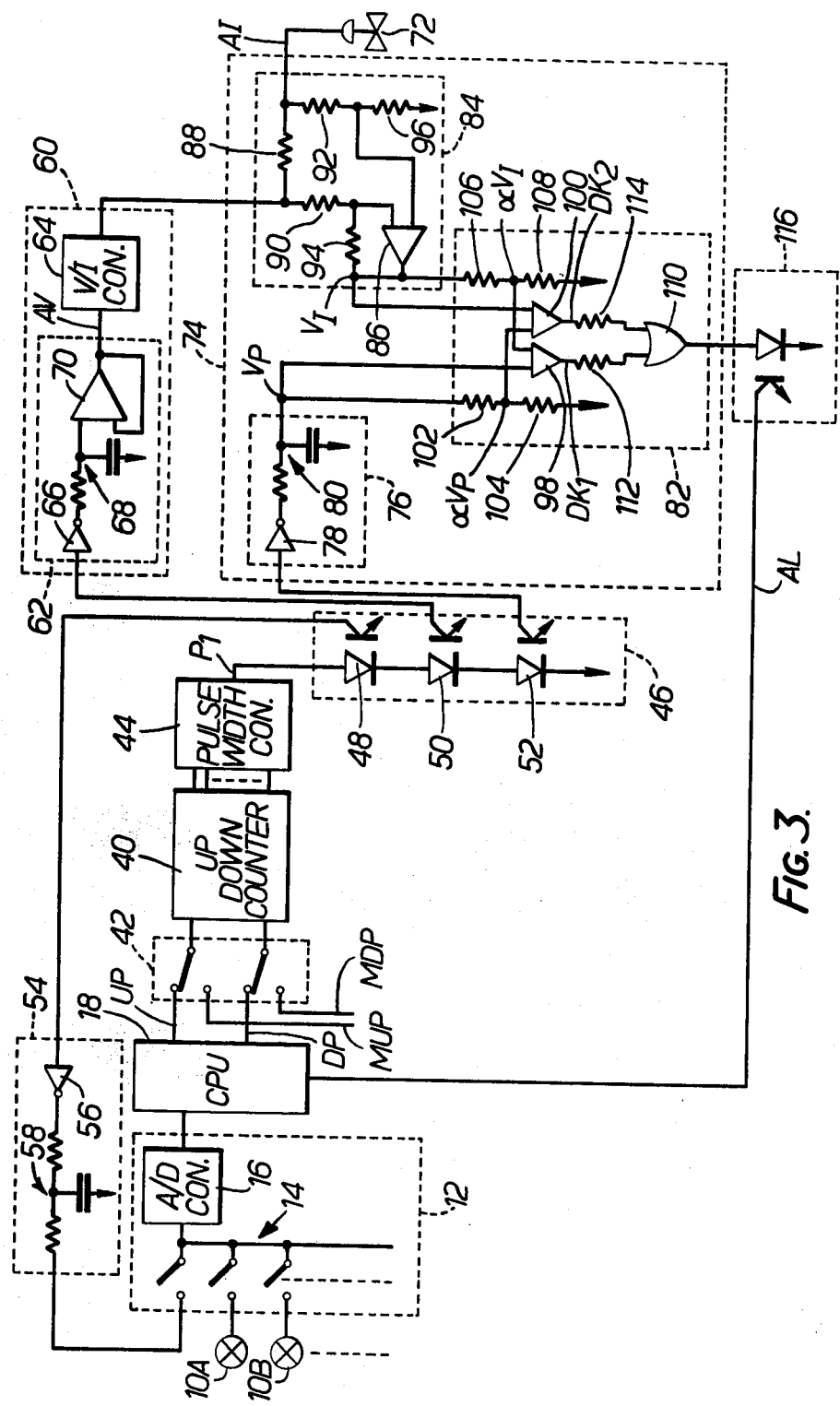
FIG. 3 is an electrical schematic diagram of a digital controller according to this invention.

Referring to FIG. 3, a plurality of detectors 10A, 10B, . . . and an analog input circuit 12 are provided in the manner shown in FIG. 1. The digital signals converted from the analog signals of the detectors 10A, 10B, . . . are processed in the central processor unit (CPU) 18.

Up-count pulse signals UP and down-count pulse signals DP generated by the CPU 18 are applied to an up-down counter 40 through a manual-automatic exchange circuit 42. When the manual-automatic exchange circuit 42 is positioned in an automatic exchange position, the up-count signals UP or the down-count signals DP are applied as difference signals to the up-down counter 40. When the manual-automatic exchange circuit 42 selects a manual exchange position, the up-count signals MUP or the down-count signals MDP are applied to the up-down counter 40. In that case an optional digital value is stored in the up-down counter 40.

A pulse width converter 44 produces pulse signals P1 having pulse widths with duty ratios proportional to the content of the up-down counter 40.

A first coupling circuit 46 including three photocouplers 48, 50 and 52 is connected to the output of the pulse width converter 44.

A secondary output pulse signal generated by the first photocoupler 48 is applied as an input to the multiplexer 14 through a pulse width-to-voltage circuit 54 as a feedback signal. The pulse width-to-voltage circuit 54 includes an inverter 56 and an integration circuit 58.

The CPU 18 operates to identify a malfunction in the digital processing loop when the feedback value is larger than the predetermined value in the manner explained below.

A secondary output pulse signal of the second photocoupler 50 is applied to a manipulation signal generation circuit 60. The manipulation signal generation circuit 60 includes a pulse width-to-voltage converter 62 and a voltage-to-current (V/I) converter 64. The pulse width-to-voltage converter 62 produces a direct current voltage AV in accordance with the pulse width of the pulse signal P1 from the pulse width converter 44. In the pulse width-to-voltage converter 62, the output signal P1 of the pulse width converter 44 is inverted by an inverter 66. The inverted signal is integrated by an integration circuit 68 including a resistor and a capacitor. The output signal of the integration circuit 68 is applied to the V/I converter 64 through an operational amplifier 70. The output voltage AV of the operational amplifier 70 is converted to a manipulation current signal AI by the V/I converter 64. The manipulation current signal (manipulated variable signal) AI is applied to an actuator 72 such as a motor valve.

A secondary output pulse signal of the third photocoupler 52 is applied to a monitor circuit 74. The output pulse signal is applied to a pulse width-to-voltage converter 76 including an inverter 78 and an integration circuit 80. The output signal Vp of the pulse width-to-voltage converter 76 is applied to a comparator circuit 82 as a first comparison input signal.

The output current signal AI of the V/I converter 64 is converted to a voltage signal VI by a current-to-voltage converter 84 including an operational amplifier 86 and resistors 88, 90, 92, 94 and 96. The output signal VI of the current-to-voltage converter 84 is applied to the comparator circuit 82 as a second comparison input signal.

The comparator circuit 82 includes first and second comparators 98 and 100. The first comparison input signal Vp is applied to one terminal of the first comparator 98. A first comparison input signal $\alpha$Vp produced by the voltage divider resistors 102 and 104 is applied to one terminal of the second comparator 100. The second comparison input signal VI is applied to the other terminal of the second comparator 100. A second comparison input signal $\alpha$VI produced by the voltage divider resistors 106 and 108 is applied to the other terminal of the first comparator 98.

The first comparator 98 compares the input voltage signal Vp with $\alpha$VI. When the input voltage signal Vp is higher than the voltage VI, the first comparator 98 produces an abnormality detection signal DK1 and supplies it to one terminal of an OR circuit 110 through a resistor 112. Similarly, the second comparator 100 compares the input voltage signal VI with $\alpha$Vp. When the input voltage signal VI is higher than the voltage $\alpha$Vp, the second comparator 100 produces an abnormality detection signal DK2 and supplies it to the other terminal of the OR circuit 110 through a resistor 114. The output signal of the OR circuit 110 is applied to a second coupling circuit 116 including a photocoupler.

The monitor circuit 74 detects a malfunction in the pulse width-to-voltage converter 62 and the V/I converter 64 when the difference between the detection voltage of the output of the pulse width converter 44 and the detection voltage based on the current signal AI of the V/I converter 64 is larger than the predetermined value. The secondary output signal AL, that is, the abnormality detection signal of the photocoupler 116, is applied to the CPU 18. The CPU 18 processes the signed AL to detect a malfunction in the manipulation signal generation circuit 60. If the aforementioned difference is 5%, $\alpha$ can be expressed as follows:

$$\alpha = R_{11}/(R_{11}+R_{12}) = R_{21}/(R_{21}+R_{22}) = 0.95$$

where the resistance value of the resistors 102, 104 and 106, 108 are $R_{11}$, $R_{12}$ and $R_{21}$, $R_{22}$.

According to this invention, it is easy to isolate the digital processing loop from the analog output loop, because the content of up-down counter 40 is converted to the pulse signals having selected pulse width by the pulse width converter 44.

The photocouplers 48, 50, 52 and 116 are used for coupling the pulse width converter 44 and the analog output loop. However, a pulse isolation element, such as pulse transformers, may be used for coupling them. Since the pulse signal of the pulse width converter 44 is used as the feedback signal for the CPU 18, the CPU 18 can detect malfunctions in either the up-down counter 40 or the pulse width converter 44.

It will be further apparent to those skilled in the art, that modifications and variations can be made to the pyramidal processing system of the instant invention without departing from the scope or spirit of the invention and it is intended that the present invention cover such modifications and variations of the controller provided that they come within the scope of the appended claims and their equivalents.

What is claimed is:

1. A digital controller comprising:
a plurality of detectors producing analog signals;
an analog input circuit for converting the analog signals to corresponding digital signals;
a central processor unit for processing said digital signals;
counter means for counting an output signal of said central processor unit;
a pulse width converter circuit for producing a pulse signal having a pulse width corresponding to the content of said counter means;
first coupling means for producing a first signal responsive to the pulse signal of said pulse width converter circuit;
a manipulation signal generation circuit for producing an analog manipulation signal responsive to the first signal of said first coupling means;
a monitor circuit for producing an abnormality detection signal if the ratio between the first signal and the manipulation signal is higher than a predetermined value;

second coupling means for producing a second signal responsive to the abnormality detection signal of said monitor circuit and applying the second signal to said central processor unit; and a feedback circuit for applying the first signal to said analog input circuit.

2. The digital controller of claim 1 wherein said central processor unit includes a microprocessor.

3. The digital controller of claim 1 wherein said first and second coupling means include photocouplers.

* * * * *